United States Patent [19]

Sugiura

[11] Patent Number: 4,995,708

[45] Date of Patent: Feb. 26, 1991

[54] PHOTOGRAPHIC LENS FREE FROM FORMING OF GHOST IMAGE

[75] Inventor: Muneharu Sugiura, Tokyo, Japan

[73] Assignee: Canon Kabushiki Kaisha, Tokyo, Japan

[21] Appl. No.: 223,108

[22] Filed: Jul. 22, 1988

[30] Foreign Application Priority Data

Aug. 5, 1987 [JP] Japan ................................ 62-196569

[51] Int. Cl.⁵ ............................................. G02B 15/14
[52] U.S. Cl. ..................................... 350/427; 350/450
[58] Field of Search ................. 350/423, 427, 448–450

[56] References Cited

U.S. PATENT DOCUMENTS

| | | | |
|---|---|---|---|
| 4,432,615 | 2/1984 | Ikamori | 350/450 X |
| 4,437,733 | 3/1984 | Takahashi et al. | 350/427 |
| 4,482,218 | 11/1984 | Tanaka | 350/450 X |
| 4,623,226 | 11/1986 | Fujii | 350/450 X |
| 4,662,723 | 5/1987 | Imai | 350/450 X |

*Primary Examiner*—Scott J. Sugarman
*Attorney, Agent, or Firm*—Fitzpatrick, Cella Harper & Scinto

[57] ABSTRACT

A photographic lens including a plurality of lenses on the image plane side of an aperture stop for determining values of the F-number, wherein stray light reflected, in turn, from a predetermined image plane or thereabout and each lens surface is prevented from taking a focus at so near a position to the predetermined image plane as to deteriorate the image quality.

6 Claims, 5 Drawing Sheets

PHOTOGRAPHIC LENS FREE FROM FORMING OF GHOST IMAGE

BACKGROUND OF THE INVENTION

1. Field of the Invention

This invention relates to photographic lenses and, more particularly, to zoom lenses suited to video cameras.

2. Description of the Related Art

The video camera employs, as its image pickup element, a CCD, MOS, etc. This type of image pickup element has, however, a high reflection factor of the cover glass in front of it, or the image receiving surface thereof. Therefore, since reflected light from the image pickup element (image plane) goes back into the photographic lens and is reflected again backward from the lens surfaces to be incident on the image pickup element, a series of so-called ghost images are formed on the image pickup element.

When the reflected light from the lens surface is focused at or near the image pickup element, it forms the ghost images of the object being photographed. On the other hand, when such reflected light is focused at an appreciably long distance from the image pickup element, it becomes undesirable light which is called flare.

For example, the reflection, in turn, from the image pickup element surface and the photographic lens surface which, though putting the focus of the reflected light more or less away from the image plane, brings it behind the image plane gives rise to the undesirable light with high possibility when the aperture stop is closed down.

From this point of view, the lens for the video camera is required not only to be well corrected for aberrations, but also to be free from the undesirable light. As the minimization of the size of zoom lens advances, the difficulty of lens design for both good correction of spherical aberration, coma and distortion and sufficient reduction of the undesirable light increases. This leads to a lowering of the contrast of the image.

Meanwhile, zoom lenses suited to video cameras are known in U.S. Pat. Nos. 4,618,219, 4,621,905, 4,525,036, 4,659,187, 4,653,874, and 4,518,228. In addition, there are Japanese Laid-Open Patent Application Nos., Sho 59-222807, 60-260912 and 61-20291 U.S. patent application Ser. No. 190,472 filed May 5, 1988 now U.S. Pat. No. 4,812,024.

SUMMARY OF THE INVENTION

An object of the present invention is to provide a photographic lens for good image quality.

A second object is to provide a photographic lens which does not cause formation of ghost and striking flare.

A third object is to provide a zoom lens suited to video cameras, particularly color video cameras.

DETAILED DESCRIPTION OF THE PREFERRED EMBODIMENTS

In the following, what problems arise are pointed out and then the present invention is described in connection with embodiments thereof by reference to the drawings.

Figure 4:
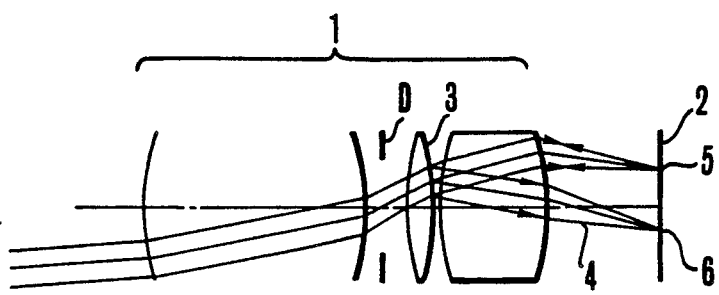
FIG. 4 is a diagram showing how the conventional zoom lens forms the ghost image.

Referring first to FIG. 4, there is shown a case that the conventional zoom lens has such a surface that the reflected light becomes the undesirable light for the image. At the predetermined image plane of a photographic lens 1 is positioned an image pickup element 2 on which light coming from an object to be photographed focuses an image of the object. Because the reflection factor of the surface of the image pickup element 2 is high, some of the arriving rays will return back along the path through which they have come, entering again the photographic lens 1. Taking an arbitrarily selected one of the lens surfaces at 3 in the photographic lens 1, some of the returning rays are reflected therefrom and the reflected rays 4, while converging, advance again toward the image plane. In this case, formed in the object image 5 on the image pickup element 2 is a ghost image 6 as the undesirable light. D is an aperture stop for determining F-numbers, or lens speeds.

Figure 5:
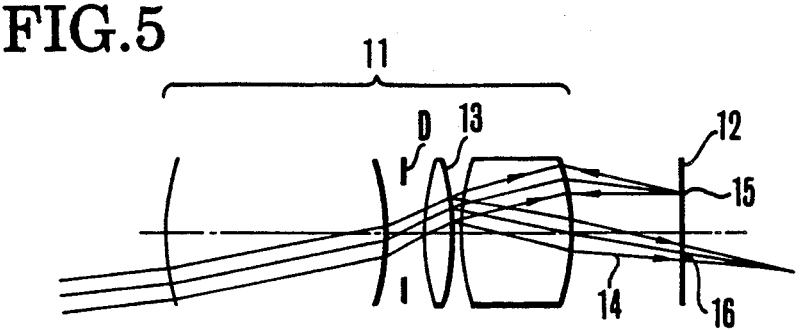
FIG. 5 is similar to FIG. 4 except that how flare is formed is illustrated.

For another case shown in FIG. 5, a light bundle 14 reflected, in turn, from the image pickup element 12 and a lens surface 13 focuses behind the image pickup element 12 (on the farther side of it to the photographic lens 11). In this case, the stray light 16 on the image pickup element 12 does not become a ghost image. Since, however, its focus lies at a longer distance than that of the image pickup element 12 from the photographic lens 11, the stray light 16 is converging, as its spot on the image pickup element 12 gets relatively smaller in size. Therefore, it is liable to become the undesirable light.

Figure 3:
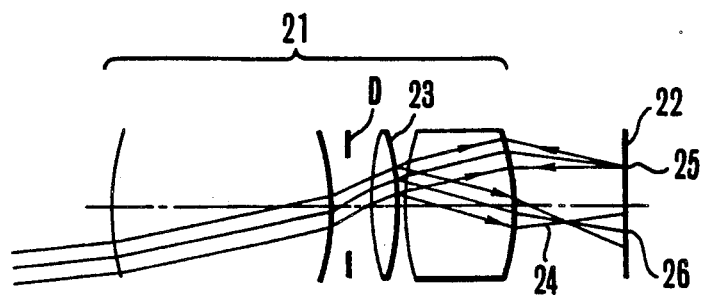
FIG. 3 is a diagram of optics illustrating the embodiment of the invention.

Meanwhile, as shown in FIG. 3, a stray light 24 reflected, in turn, from the image pickup element 22 and a lens surface 23 may be brought to focus on the photographic lens 21 side of the predetermined image plane (the image pickup element 22). In connection with this case, it has been found that the stray light 26 on the image pickup element 22 not only forms no ghost image, but also, because of its tendency to diffusion, is hard to become the undesirable light.

Accordingly, the present invention sets forth a principle of lens design that for each lens surface which lies on the image plane side of the aperture stop, a ray tracing is carried out on the assumption that a ray returning from the image plane is reflected from the lens surface. Even if, among reflected rays from the lens surface, there is a ray which is to form an image, this image is made to focus on the photographic lens side of the predetermined image plane by the bending technique. Thus, the radius of curvature of each of the lens surfaces which produce the undesirable light is so determined as to remove its effect. In other words, for a given configuration of the lens surface, if the reflected light therefrom diverges before it enters the predetermined image plane, or, focuses at a far long distance in rear of the predetermined image plane, no bad effect will be produced on the object image. In the pre-design, however, if it has been sought out that there is a certain configuration which results in a stray light converging at so near a position to the predetermined image plane as to influence the object image, this configuration has to be later modified to shift the position of convergence toward the photographic lens. It should be noted that the reason why the principle of the invention is applied only to the rear part of the lens system with respect to the aperture stop is as follows: when the aperture is at full open, because rays of various angles are admitted to enter, the influence of the undesirable light is so uniform that it is not very appreciable over the entire area of the image plane and in actual practice, therefore, can be ignored. On the other hand, stopping down of the aperture intensifies such influence. Therefore, a part of the lens system which becomes a source for reflected light when the aperture is stopped down is taken as essential.

The bending of the lens, however, alters the aberrations. Compensation for this change of aberrations should be considered when the lens design is performed. Although it seems that no difficult problems would arise in this from the standpoint of the present state of art of lens design, conditions (1) to (5) set forth later provide a measure of facilitating reduction of the difficulty of design. Of these, conditions (2) and (3) concern with the removal of the undesirable light.

Figure 1:
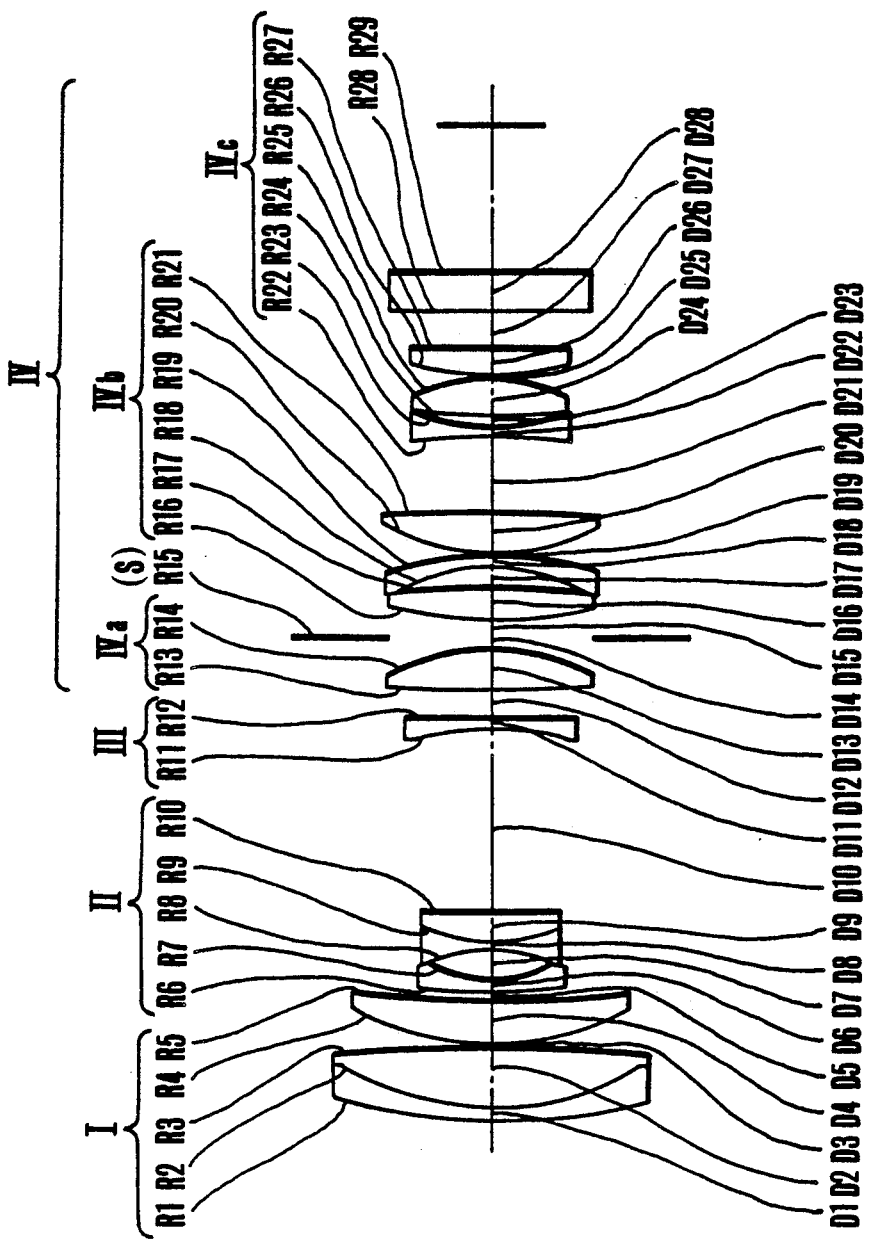
FIG. 1 is a longitudinal section view of a zoom lens in a numerical example 1 according to the invention.
Figure 2A:
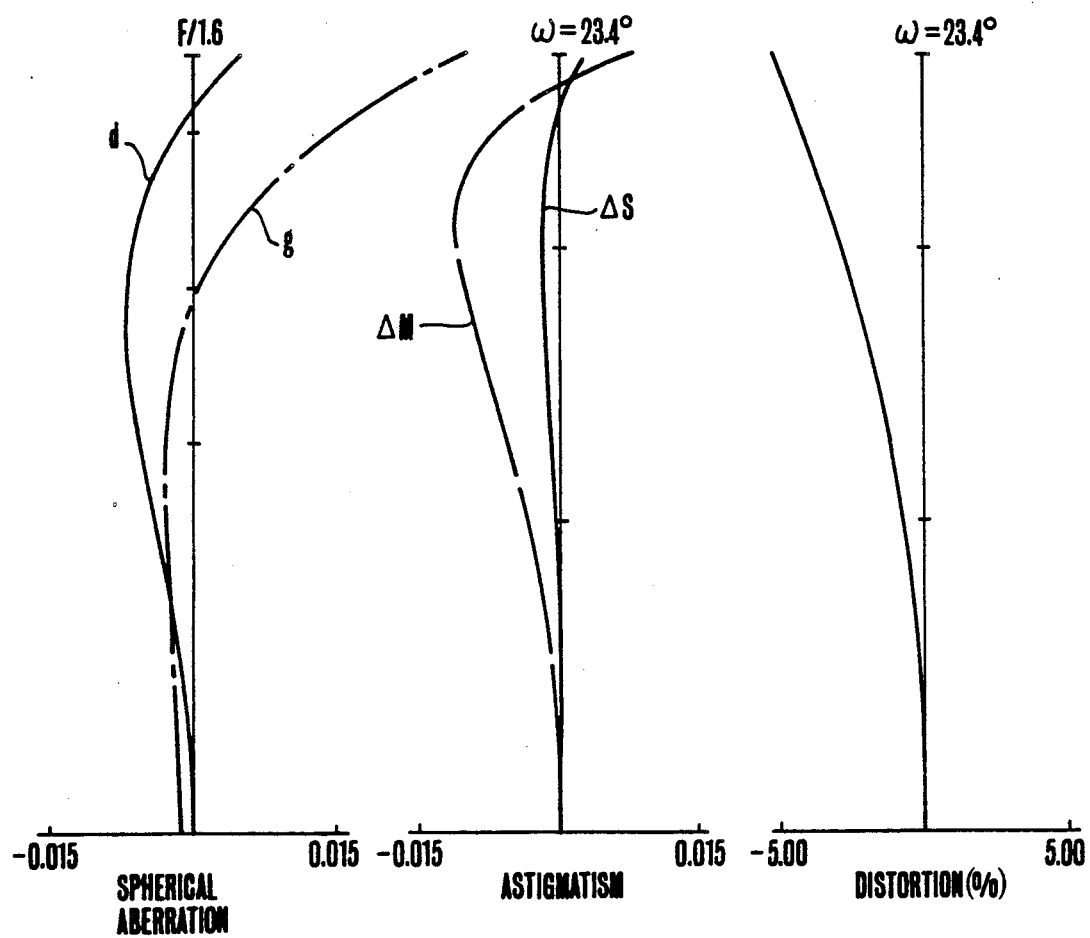
FIG. 2(a), FIG. 2(b) and FIG. 2(c) are graphic representations of the aberrations of the lens of FIG. 1 in the wide angle end, intermediate, and telephoto end respectively.
Figure 2B:
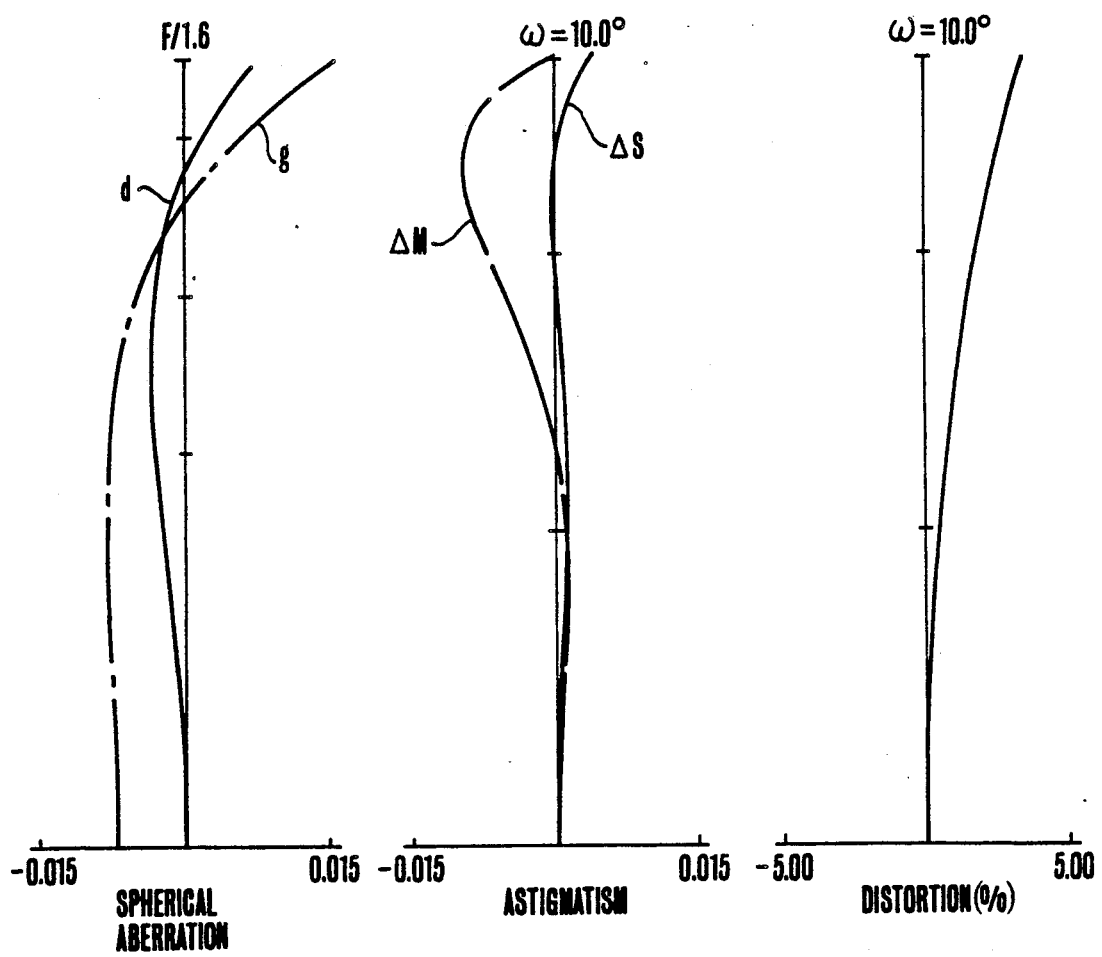
Figure 2C:
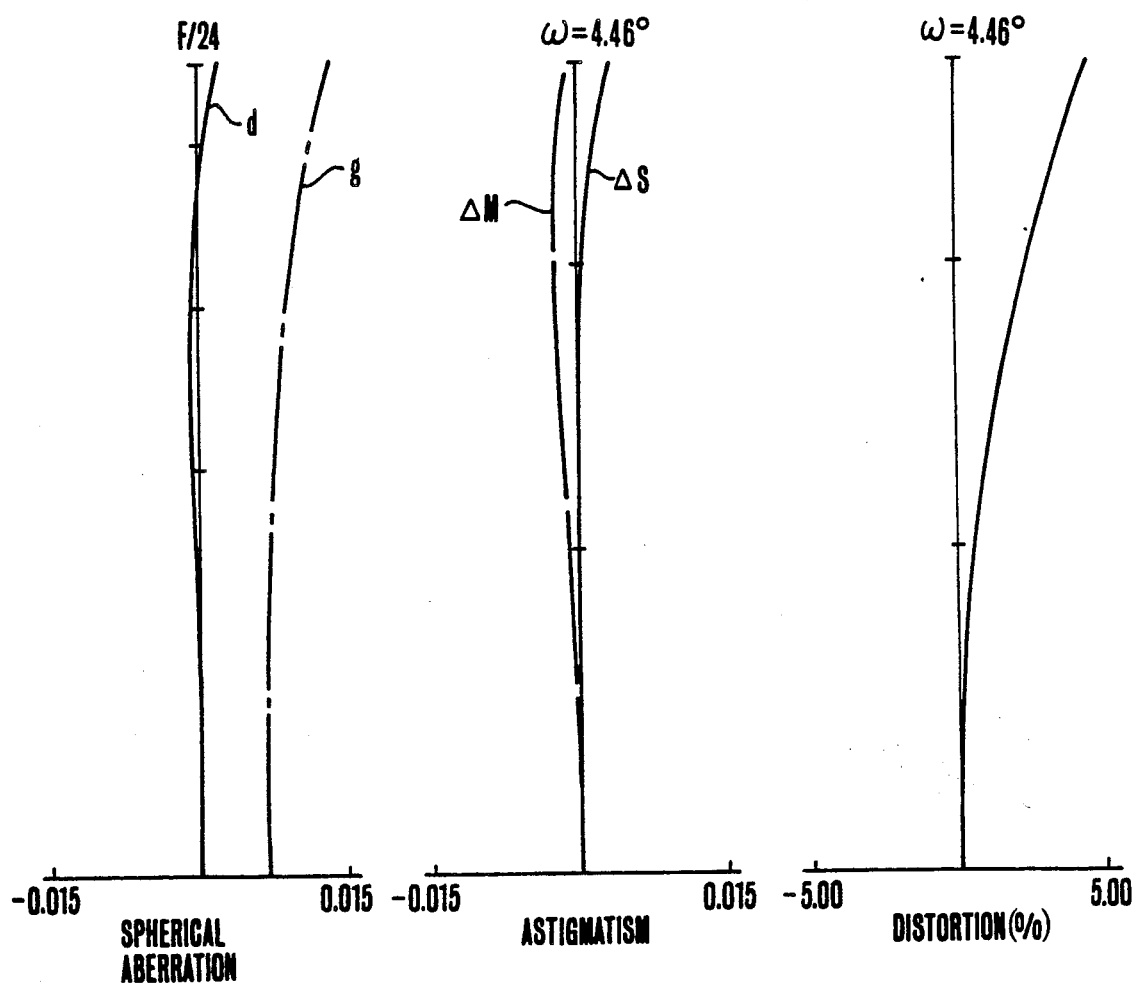

FIG. 1 depicts an example of a zoom lens comprising, from front to rear, a first lens unit I of positive power for focusing, a second lens unit II of negative power for varying the image magnification, a third lens unit III of negative power for compensating for the shift of an image plane resulting from the variation of the image magnification, and a fourth lens unit IV of positive power for forming an image. The image forming lens unit IV is constructed with a front part IVa of positive power which has an afocal function followed after an aperture stop S by a rear part which includes a front lens sub-unit IVb comprised of positive, negative and positive lenses and a rear lens sub-unit IVc comprised of negative, positive and positive lenses, satisfying the following conditions:

$$0.4 < |r_{1a}/r_{1b}| < 0.94 \quad (1)$$

(wherein $r_{1a} > 0$; $r_{1b} < 0$)

$$-3.42 < r_{2b}/fw < -2.26 \quad (2)$$

$$-6.8 < r_{4a}/fw < -4.0 \quad (3)$$

$$0.15 < d_{1\text{-}2}/fw < 0.22 \quad (4)$$

$$0.5 < d_{3\text{-}4}/fw < 0.87 \quad (5)$$

where $r_{ia}$ and $r_{ib}$ are respectively the radii of curvature of front and rear surfaces of the i-th lens counting from front in the rear part IVb–IVc; $d_{i\text{-}(i+1)}$ is the axial separation between the i-th and (i+1)th lenses; and fw is the shortest focal length of the entire lens system.

When such design rules for the shape and power of each lens in the front and rear sub-units IVb and IVc are satisfied, a minimization of the undesirable light caused by the reflection, in turn, from the image plane and each of these lens surfaces is achieved in such a manner as to well correct aberrations over the entire zooming range.

The technical significance of each of the above-defined conditions is explained below.

The inequalities of condition (1) are for good balanced correction of spherical aberration and coma. When the upper limit is exceeded, under-correction of spherical aberration results. When the lower limit is exceeded, coma is produced.

The inequalities of condition (2) are for minimizing the coma produced and for establishing the reflection, in turn, from the image pickup element and the above-identified lens surface so that the focus of the reflected light from that lens surface which would otherwise become the undesirable light is spaced away from the image plane and brought forward to the photographic lens. When the upper limit is exceeded, the focus of the stray light caused by the reflection, in turn, from the image pickup element and that lens surface falls at a near position either on the front or the rear side of the image plane. Thus, the undesirable light becomes conspicuous. When the lower limit is exceeded, inward coma is produced which is difficult to correct by any design of the other surfaces.

The inequalities of condition (3) are for correcting curvature of field and coma. When the upper limit is exceeded, inward coma is produced and the field curvature is also under-corrected. When the lower limit is exceeded, outward coma is produced, and over-correction of field curvature results.

The inequalities of condition (4) represent a proper range for the air separation between the first and second lenses in the front lens sub-unit IVb to well correct spherical aberration and, in the entire area of the picture frame, coma. When the upper limit is exceeded, over-correction of spherical aberration results, and the coma is largely increased. When the lower limit is exceeded, the spherical aberration becomes under-corrected.

The inequalities of condition (5) represent a proper range for the separation between the front and rear lens sub-units IVb and IVc. This enables realization of an optical system which is well corrected for coma and lateral chromatic aberration in good balance over the entire area of the picture frame, and is freed from producing the undesirable light. When the upper limit is exceeded, large outward coma is produced, and the lateral chromatic aberration tends to be over-corrected. When the lower limit is exceeded, the lateral chromatic aberration becomes under-corrected. The undesirable light is intensely produced.

It will be appreciated from the foregoing that the above-described conditions are set forth to achieve a compact zoom lens which is prevented from forming any recognizable ghost images or flare spots, while still maintaining good correction of aberrations.

It is to be understood that the invention is applicable not only to zoom lenses but also to fixed-focal length lenses.

Numerical examples 1 to 3 of the invention are shown in tables below for the radii of curvature, R, the axial thicknesses or air separations, D, and the refractive indices, N, and Abbe numbers, $\nu$, of the glasses of the lenses with the subscripts numbered consecutively from front to rear.

In these tables, R28 and R29 define a glass block such as face plate, low-pass filter or the like.

| Numerical Example 1 |||||||
|---|---|---|---|---|---|---|
| F = 1 — 5.555 || FNO = 1:1.6 — 24 ||| 2ω = 46.8° — 8.92° ||
| R1 = | 4.9285 | D1 = | 0.1102 | N1 = 1.80518 | ν 1 = | 25.4 |
| R2 = | 2.3912 | D2 = | 0.4937 | N2 = 1.51633 | ν 2 = | 64.1 |
| R3 = | —10.2158 | D3 = | 0.0118 | | | |
| R4 = | 2.1242 | D4 = | 0.3622 | N3 = 1.60311 | ν 3 = | 60.7 |
| R5 = | 11.9622 | D5 = | Variable | | | |
| R6 = | 5.5750 | D6 = | 0.0630 | N4 = 1.69680 | ν 4 = | 55.5 |
| R7 = | 0.9192 | D7 = | 0.2720 | | | |
| R8 = | —1.1843 | D8 = | 0.0630 | N5 = 1.69680 | ν 5 = | 55.5 |
| R9 = | 1.1848 | D9 = | 0.2283 | N6 = 1.84666 | ν 6 = | 23.9 |
| R10 = | 10.6925 | D10 = | Variable | | | |
| R11 = | —2.1750 | D11 = | 0.0787 | N7 = 1.71300 | ν 7 = | 53.8 |
| R12 = | —40.2989 | D12 = | Variable | | | |
| R13 = | 9.2253 | D13 = | 0.3543 | N8 = 1.69680 | ν 8 = | 55.5 |
| R14 = | —1.7144 | D14 = | 0.0787 | | | |
| R15 = | 0.0(Stop) | D15 = | 0.1480 | | | |
| R16 = | 3.4281 | D16 = | 0.2598 | N9 = 1.51633 | ν 9 = | 64.1 |
| R17 = | —5.9668 | D17 = | 0.1876 | | | |
| R18 = | —1.4978 | D18 = | 0.0866 | N10 = 1.84666 | ν 10 = | 23.9 |
| R19 = | —2.8197 | D19 = | 0.0118 | | | |
| R20 = | 1.5573 | D20 = | 0.3622 | N11 = 1.60311 | ν 11 = | 60.7 |
| R21 = | —43.2033 | D21 = | 0.6294 | | | |
| R22 = | —5.8186 | D22 = | 0.0630 | N12 = 1.83400 | ν 12 = | 37.2 |
| R23 = | 1.3836 | D23 = | 0.1089 | | | |
| R24 = | 4.9164 | D24 = | 0.3150 | N13 = 1.51633 | ν 13 = | 64.1 |
| R25 = | —1.3525 | D25 = | 0.0118 | | | |
| R26 = | 2.0026 | D26 = | 0.2205 | N14 = 1.51742 | ν 14 = | 52.4 |
| R27 = | 0.0 | D27 = | 0.3150 | | | |
| R28 = | 0.0 | D28 = | 0.3150 | N15 = 1.51633 | ν 15 = | 64.1 |
| R29 = | 0.0 | | | | | |

| Variable Distances ||||
|---|---|---|---|
| f | 1.000 | 2.449 | 5.555 |
| D5 | 0.0886 | 1.0061 | 1.5098 |
| D10 | 1.5403 | 0.4061 | 0.2585 |
| D12 | 0.2327 | 0.4493 | 0.0933 |

| Variable Distance ||||
|---|---|---|---|
| f | 1.000 | 2.449 | 5.555 |
| D5 | 0.086 | 1.0061 | 1.5098 |
| D10 | 1.5403 | 0.4061 | 0.2585 |
| D12 | 0.2327 | 0.4493 | 0.0933 |

| Numerical Example 2 |||||||
|---|---|---|---|---|---|---|
| F = 1 — 5.555 || FNO = 1:1.6 — 24 ||| 2ω = 46.8° — 8.92° ||
| R1 = | 4.9285 | D1 = | 0.1102 | N1 = 1.80518 | ν 1 = | 25.4 |
| R2 = | 2.3912 | D2 = | 0.4937 | N2 = 1.51633 | ν 2 = | 64.1 |
| R3 = | —10.2158 | D3 = | 0.0118 | | | |
| R4 = | 2.1242 | D4 = | 0.3622 | N3 = 1.60311 | ν 3 = | 60.7 |
| R5 = | 11.9622 | D5 = | Variable | | | |
| R6 = | 5.5750 | D6 = | 0.0630 | N4 = 1.69680 | ν 4 = | 55.5 |
| R7 = | 0.9192 | D7 = | 0.2720 | | | |
| R8 = | —1.1843 | D8 = | 0.0630 | N5 = 1.69680 | ν 5 = | 55.5 |
| R9 = | 1.1848 | D9 = | 0.2283 | N6 = 1.84666 | ν 6 = | 23.9 |
| R10 = | 10.6925 | D10 = | Variable | | | |
| R11 = | —2.1750 | D11 = | 0.0787 | N7 = 1.71300 | ν 7 = | 53.8 |
| R12 = | —40.2989 | D12 = | Variable | | | |
| R13 = | 9.2253 | D13 = | 0.3543 | N8 = 1.69680 | ν 8 = | 55.5 |
| R14 = | —1.7144 | D14 = | 0.0787 | | | |
| R15 = | 0.0(Stop) | D15 = | 0.1480 | | | |
| R16 = | 3.5247 | D16 = | 0.2598 | N9 = 1.56384 | ν 9 = | 60.7 |
| R17 = | —7.2259 | D17 = | 0.1907 | | | |
| R18 = | —1.5006 | D18 = | 0.0866 | N10 = 1.84666 | ν 10 = | 23.9 |
| R19 = | —2.8542 | D19 = | 0.0118 | | | |
| R20 = | 1.5584 | D20 = | 0.3622 | N11 = 1.60311 | ν 11 = | 60.7 |
| R21 = | —41.1936 | D21 = | 0.6002 | | | |
| R22 = | —6.1294 | D22 = | 0.0630 | N12 = 1.83400 | ν 12 = | 37.2 |
| R23 = | 1.3958 | D23 = | 0.1056 | | | |
| R24 = | 4.9820 | D24 = | 0.3150 | N13 = 1.51633 | ν 13 = | 64.1 |
| R25 = | —1.3638 | D25 = | 0.0118 | | | |
| R26 = | 2.2520 | D26 = | 0.2205 | N14 = 1.57135 | ν 14 = | 53.0 |
| R27 = | 1401.5349 | D27 = | 0.3150 | | | |
| R28 = | 0.0 | D28 = | 0.3150 | N15 = 1.51633 | ν 15 = | 64.1 |
| R29 = | 0.0 | | | | | |

| Numerical Example 3 | | | | | | |
|---|---|---|---|---|---|---|
| F = 1 – 5.555 | | FNO = 1:1.6 – 24 | | 2ω = 46.8° – 8.92° | | |
| R1 = | 4.9285 | D1 = | 0.1102 | N1 = | 1.80518 | ν1 = 25.4 |
| R2 = | 2.3912 | D2 = | 0.4937 | N2 = | 1.51633 | ν2 = 64.1 |
| R3 = | −10.2158 | D3 = | 0.0118 | | | |
| R4 = | 2.1242 | D4 = | 0.3622 | N3 = | 1.60311 | ν3 = 60.7 |
| R5 = | 11.9622 | D5 = | Variable | | | |
| R6 = | 5.5750 | D6 = | 0.0630 | N4 = | 1.69680 | ν4 = 55.5 |
| R7 = | 0.9192 | D7 = | 0.2720 | | | |
| R8 = | −1.1843 | D8 = | 0.0630 | N5 = | 1.69680 | ν5 = 55.5 |
| R9 = | 1.1848 | D9 = | 0.2283 | N6 = | 1.84666 | ν6 = 23.9 |
| R10 = | 10.6925 | D10 = | Variable | | | |
| R11 = | −2.1750 | D11 = | 0.0787 | N7 = | 1.71300 | ν7 = 53.8 |
| R12 = | −40.2989 | D12 = | Variable | | | |
| R13 = | 9.2253 | D13 = | 0.3543 | N8 = | 1.69680 | ν8 = 55.5 |
| R14 = | −1.7144 | D14 = | 0.0787 | | | |
| R15 = | 0.0(Stop) | D15 = | 0.1480 | | | |
| R16 = | 3.9338 | D16 = | 0.2677 | N9 = | 1.51633 | ν9 = 64.1 |
| R17 = | −5.0340 | D17 = | 0.1655 | | | |
| R18 = | −1.5193 | D18 = | 0.0866 | N10 = | 1.84666 | ν10 = 23.9 |
| R19 = | −2.8503 | D19 = | 0.0118 | | | |
| R20 = | 1.5818 | D20 = | 0.3622 | N11 = | 1.60311 | ν11 = 60.7 |
| R21 = | −119.7903 | D21 = | 0.7245 | | | |
| R22 = | −4.6473 | D22 = | 0.0630 | N12 = | 1.83400 | ν12 = 37.2 |
| R23 = | 1.4265 | D23 = | 0.0899 | | | |
| R24 = | 3.9768 | D24 = | 0.2913 | N13 = | 1.51633 | ν13 = 64.1 |
| R25 = | −1.3449 | D25 = | 0.0118 | | | |
| R26 = | 1.9192 | D26 = | 0.2520 | N14 = | 1.51742 | ν14 = 52.4 |
| R27 = | −1568.5503 | D27 = | 0.3150 | | | |
| R28 = | 0.0 | D28 = | 0.3150 | N15 = | 1.51633 | ν15 = 64.1 |
| R29 = | 0.0 | | | | | |

| | Variable Distance | | |
|---|---|---|---|
| f | 1.000 | 2.449 | 5.555 |
| D5 | 0.086 | 1.0061 | 1.5098 |
| D10 | 1.5403 | 0.4061 | 0.2585 |
| D12 | 0.2327 | 0.4493 | 0.0933 |

What is claimed is:

1. A photographic lens having from the object side a first positive lens unit for focusing, a second negative lens unit movable for varying image magnification, a third negative lens unit movable for compensation of movement of an image plane, a bi-convex lens having a surface of larger curvature on its image side than its surface on the object side, a diaphragm, and front and rear sub-units each composed of a plurality of lenses, said front and rear sub-units each including a negative lens, wherein said bi-convex lens and said front and rear sub-units together comprise a fourth lens unit that is an image forming lens unit located on the image side of said diaphragm and predetermined lens surfaces of said image forming lens unit have shapes so defined that said predetermined lens surfaces reflect rays of light which form an image on a predetermined image plane or thereabout among rays of light which are reflected from the predetermined image plane or a neighborhood thereof, and then return to said photographic lens so that said rays of light reflected from a predetermined lens surface will form an image at a position near said photographic lens relative to the predetermined image plane.

2. A photographic lens having a plurality of lenses on the image plane side of an aperture stop, wherein a shape of a lens surface of said plurality of lenses is so defined that said lens surface reflects rays of light which form an image on a predetermined image plane or thereabout among rays of light which are reflected from the predetermined image plane or a neighborhood thereof and, then, return to said photographic lens so that said rays of light reflected from said lens surface form an image at a position near said photographic lens relative to the predetermined image plane, wherein, further, said photographic lens is a zoom lens including a front sub-unit and a rear sub-unit on the image plane side of said aperture stop, said front sub-unit comprising three lenses of positive, negative and positive powers, said rear sub-unit comprising three lenses of negative, positive and positive powers, and where the radii of curvature of front and rear surfaces of the i-th lens counting from front in said six lenses are denoted by ria and rib respectively, and the shortest focal length of the entire lens system is denoted by fw, the following conditions being satisfied:

$$-3.42 < r2b/fw < -2.26$$

$$-6.8 < r4a/fw < -4.0$$

3. A photographic lens according to claim 2, further satisfying the following conditions:

$$0.4 < |r_{1a}/r_{1b}| < 0.94$$

$$0.15 < d_{1\text{-}2}/fw < 0.22$$

$$0.5 < d_{3\text{-}4}/fw < 0.87$$

where $d_{i\text{-}(i+1)}$ is the separation between the i-th and (i+1)th lenses counting from front in said six lenses.

4. A photographic lens according to claim 2, wherein said zoom lens includes, on the object side of said aperture stop, a positive first lens unit for focusing, a negative second lens unit for variation of image magnification, a negative third lens unit for compensation for image shift and a positive lens unit for converting an entering light beam to a substantially a focal exiting light beam.

5. A zoom lens comprising, from front to rear, a positive first lens unit for focusing, a negative second lens unit for variation of image magnification, a negative third lens unit for compensation for image shift, and a fourth lens unit for forming an image, said fourth lens unit including, in rear of an aperture stop, positive, negative, positive, negative, positive and positive lenses, and satisfying the following conditions:

$$-3.42 < r_{2b}/fw < -2.26$$

$$-6.8 < r_{4a}/fw < -4.0$$

where $r_{ia}$ and $r_{ib}$ are the radii of curvature of front and rear surfaces of the i-th lens counting from front in said six lenses, and fw is the shortest focal length of the entire lens system.

6. A zoom lens according to claim 5, further satisfying the following conditions:

$$0.4 < |r_{1a}/r_{1b}| < 0.94$$

$$0.15 < d_{1\text{-}2}/fw < 0.22$$

$$0.5 < d_{3\text{-}4}/fw < 0.87$$

where $d_{i\text{-}(i+1)}$ is the separation between the i-th and (i+1)th lenses counting from front in said six lenses.

* * * * *

UNITED STATES PATENT AND TRADEMARK OFFICE
CERTIFICATE OF CORRECTION

PATENT NO. : 4,995,708
DATED : February 26, 1991
INVENTOR(S) : MUNEHARU SUGIURA

It is certified that error appears in the above-identified patent and that said Letters Patent is hereby corrected as shown below:

Column 1

Line 47, "61-20291 U.S." should read --61-20291 and U.S.--.

Column 8

Line 39, "ria and rib" should read --$r_{1a}$ and $r_{1b}$--.

Line 44, "r2b" should read --$r_{2b}$--.

Line 46, "r4a" should read --$r_{4a}$

Line 63, "positive lens unit" should read --positive fourth lens unit--

Line 64, "a focal" should read --afocal--.

Signed and Sealed this

Fifteenth Day of September, 1992

Attest:

DOUGLAS B. COMER

Attesting Officer

Acting Commissioner of Patents and Trademarks